3,256,229
ADHESIVE PATCHING COMPOSITION
Rudolph B. Janota, Lansing, and Daniel G. Keefe, Clarendon Hills, Ill., assignors to Swift & Company, Chicago, Ill., a corporation of Illinois
No Drawing. Filed Jan. 28, 1959, Ser. No. 789,481
14 Claims. (Cl. 260—29.6)

The present invention relates to an improved adhesive patching composition.

There is a substantial need for compositions that are capable of patching various structures such as sidewalks and concrete walls and floors. Many of the presently known patching compositions, however, are not satisfactory because they tend to pull away from the edges of the area being repaired as curing takes place. Other compositions tend to check and crack excessively. Sill others have poor wear reistance, low tensile strength, and inadequate resistance to moisture. Such repair materials as plaster of Paris and Portland cement suffer from one or more of these deficiencies.

It is therefore an object of the present invention to provide an improved adhesive patching composition for use on cement, concrete, metals, painted and other surfaces.

Another object of the invention is to provide an adhesive patching composition which can be used in the repair of large areas without pulling away from the edges of the area.

Still another object is to provide an adhesive patching composition which has great strength and resists cracking and checking even when applied as a thin coating.

Another object of the invention is to provide an adhesive patching composition which is not adversely affected by either moisture or most acids and alkalies.

Other objects of the invention will become readily apparent to those skilled in the art from the following detailed description.

In general, the present invention involves the discovery that an adhesive patching composition having as its principle ingredients nonwaterproof Portland cement, aggregate, a water-soluble acrylic resin, and a high alumina cement such as calcium aluminate cement powder, is significantly superior to other patching materials.

The resins that are used in our formulation must be either water-soluble or water-dispersible and must form both a mechanically stable and chemically stable aqueous emulsion. It has been found that resins obtained from the polymerization of lower alkyl esters of acrylic and/or alkyl acrylic acids are suitable for our purposes. Particular polymers that may be used include the copolymer methyl acrylate (commonly referred to as acrylate) and methyl methacrylate, the copolymer of methyl methacrylate and ethyl methacrylate, and the copolymer of methyl acrylate and ethyl methacrylate. Our preferred polymer is the copolymer of methyl acrylate and methyl methacrylate. The foregoing resins are water-dispersible or water-emulsifiable and are compatible with alkaline aqueous mixtures of Portland cement. Most of these acrylic resins are commercially available in aqueous emulsions containing 40-50% solids.

The amount of resin added to our composition must be within the range of 10–100 parts by weight (on a solids basis) for each 100 parts by weight of the nonwaterproof Portland cement. The use of less than 10 parts by weight of the resin results in an appreciable loss of the adhesive property of the composition, while the use of greater amounts of resin than 100 parts by weight causes excessive checking and cracking and provides a composition which sets too hard. Our preferred range is from about 30 parts by weight to about 40 parts by weight of the resin for each 100 parts by weight of the cement.

The aggregate should be used in amounts varying from 33 to 300 parts by weight per 100 parts of nonwaterproof Portland cement. While particle-size is not critical, we prefer to use sand that is ground to from 20–80 mesh, inasmuch as this produces a fine-textured surface in the patched area. Coarse mineral aggregate can be used where it is not essential that the composition have a smooth surface.

Asbestos fibers, wood fibers, and like materials can be added to the mixture in amounts from 2 to 12% based on the weight of the Portland cement to give the composition more flexibility.

It is desirable, but not essential, that a siliconate be added to the composition. The use of a siliconate improves the trowelability of the material and also lengthens somewhat its set time. When a siliconate is added to the product we prefer to use a salt of siliconic acid known as sodium methyl siliconate. Various other water-soluble alkali metal salts of the lower alkyl siliconate acids may be employed, such as sodium and potassium methyl, ethyl, and propyl siliconate. It has been our experience that the use of from 0.04 to 1.0% of the siliconate based on the total weight of Portland cement present in the dry mixture produces a satisfactory product.

A sufficient amount of water is added to our adhesive patching composition to provide a readily workable mixture. There is no concern about using enough water to provide hydration inasmuch as the amount added to place the material in a workable condition will be greater than the amount needed to hydrate the product. The amount of water employed will vary considerably, depending upon the type and amounts of ingredients used and the requirements of the workmen. In general, however, we have found that improved results are obtained when the powder-to-liquid ratio of the composition varies from about 2–1 to about 3–1. If more than 10% excess liquid is used, based on the amount of liquid present, the composition tends to crack and shrink.

The presence of a high alumina cement such as calcium aluminate cement in the subject composition helps to prevent cracking and checking of the patched area. It also shortens the setting time of the composition to the point where a patched area can be used for pedestrian traffic in two to three hours and car and truck traffic within twelve hours, provided the composition is cured at about room temperature or higher. At lower temperatures (36–40° F.) twenty-four hours are required before the composition will support heavy traffic. Calcium aluminate cement has approximately the following composition:

| | |
|---|---|
| $SiO_2$ | 5.3 |
| $Al_2O_3$ | 39.8 |
| $Fe_2O_3 \cdot FeO$ | 14.6 |
| $CaO$ | 33.5 |
| $MgO$ | 1.3 |
| $SO_3$ | 0.1 |

The amount of high alumina cement powder added to the composition can vary from 5 to 25% of the total dry mix or from about 8 to about 50 parts by weight for each 100 parts by weight of Portland cement that is present in the composition. Our preferred range is from about 12 to about 18 parts based on 100 parts by weight of Portland cement.

The following examples are illustrative of our adhesive patching composition.

Example I

A dry mix was formulated containing the following materials:

| | Parts by weight |
|---|---|
| Grey Portland cement (nonwaterproof) | 60.8 |
| Silica sand | 27.5 |
| Asbestos fiber | 2.9 |
| Calcium aluminate cement | 8.8 |

After thoroughly blending the materials they were worked into a trowelable consistency by adding the following liquid component:

| | Parts by weight |
|---|---|
| Acrylic resin emulsion | 49.62 |
| Water | 49.63 |
| Sodium methyl siliconate | 0.75 |

The ratio of liquid to powder was approximately 1 to 2¼–2½. After blending uniformly, this patching compound reached an initial set in approximately 30 minutes when applied at 75° F. Pedestrian traffic did not adversely affect the material after a set period of five hours, and normal traffic was resumed in twelve hours. At low temperatures (36–40° F.), especially with elevated humidity, the rate of set is retarded so that 24 hours are required before normal traffic can be resumed.

Example II

The results of this test demonstrate that the use of increased amounts of sand in the formulation does not weaken the composition. The following dry materials were blended together as shown in Example I:

| | Parts by weight |
|---|---|
| Grey Portland cement (nonwaterproof) | 27.5 |
| Sand | 60.8 |
| Asbestos fiber | 2.9 |
| Calcium aluminate cement | 8.8 |

The above materials were blended with the liquid components of Example I in the proportion of one part liquid for each three parts of the powder. Other than a slight extension of the setting time of the product, this formulation was entirely satisfactory even though the sand-to-cement ratio had been changed from 1–2.21 to 2.21–1.

Example III

In order to determine the effect of calcium aluminate cement on the subject product, it was eliminated from the following formulation:

| | Parts by weight |
|---|---|
| Grey Portland cement (nonwaterproof) | 65 |
| Sand | 32 |
| Asbestos fiber | 3 |

The dry mix was converted into a trowelable paste by mixing it with the liquid component of Example I (2.25 parts powder to 1 part of liquid). When used as a patching compound, excessive cracking occurred and over 2 hours were required for the material to set.

Example IV

In order to illustrate the fact that nonwaterproof cement must be used in preparing the present composition, the formula as shown in Example I was repeated except that waterproof cement was used in place of nonwaterproof cement. When this composition was applied to a damaged area, excessive cracking occurred within 2 hours.

Example V

This example illustrates the limits within which calcium aluminate cement should be used in the present invention in order to eliminate cracks and to control setting times. The liquid component used in the example was made up as shown in Example I and was uniformly blended with the powder in the amounts set forth in the following table (all figures are parts by weight unless otherwise indicated):

| | 1 | 2 | 3 | 4 | 5 |
|---|---|---|---|---|---|
| Nonwaterproof Cement | 60 | 55 | 50 | 45 | 40 |
| Sand | 32 | 32 | 32 | 32 | 32 |
| Asbestos | 3 | 3 | 3 | 3 | 3 |
| Calcium Aluminate Cement | 5 | 10 | 15 | 20 | 25 |
| | 100 | 100 | 100 | 100 | 100 |
| Liquid Used | 45 | 34 | 28 | 31 | 30 |
| Powder/Liquid Ratio | 2.2/1 | 2.9/1 | 3.6/1 | 3.2/1 | 3.3/1 |
| Portland Cement/Aluminate Ratio | 12/1 | 5.5/1 | 3.1/1 | 2.2/1 | 1.6/1 |
| Setting Time, hour | 1 | ½ | ½ | ½ | ¼ |
| Cracking Observed | Severe | None | None | None | Slight |

From the results obtained above it was concluded that—

(1) The composition shown in column 2 was preferred because it was more economical and lighter in color than the others.
(2) The preferred range of calcium aluminate cement is from 8 to 22% of the dry powder mix.
(3) The operative limits for the calcium aluminate cement are from about 8 to about 50 parts by weight for each 100 parts by weight of the nonwaterproof Portland cement.

Inasmuch as every patching material must be applied to a properly prepared surface to be effective, it is necessary that the area to be patched be free of dirt, sand, loose particles, grease, etc. The surface may be damp, but this is not essential.

The only precaution that we observe in the use of the subject adhesive composition is to apply it as soon after mixing as possible. This follows because our preferred composition has a working life of from about 30 to about 45 minutes.

When the subject composition is used to patch deep holes or crevices, its tremendous strength can be capitalized upon by filling the area with a less expensive material and then using the subject composition for the finishing or top layer. It is not uncommon to find defects in driveways, sidewalks, patios, floors, etc., which are three to four inches deep. In such cases the lower portion of the area can be filled with a common cement, sand, and gravel mix which then can be surfaced with a quarter inch or so of our improved adhesive patching composition. In the case of very smooth surfaces finer aggregate can be employed so as to match the texture of the original structure.

When applied, our patching composition is highly resistant to attack by acid, alkali, oil grease, etc., and in addition, has such great strength and adhesiveness that the edges of the patched area do not tend to chip or crumble.

As is indicated above, the subject composition should contain nonwaterproof Portland cement. It should also include calcium aluminate cement in amounts varying from 8 to 22% of the total dry mix and from about 8 to about 50 parts by weight for each 100 parts by weight of the nonwaterproof Portland cement employed in the material. The amount of sand in the composition should be from 1 part sand and 3 parts cement to 3 parts sand and 1 part cement.

Our preferred composition consists of 30 to 40 parts by weight of resin per 100 parts by weight of nonwaterproof Portland cement, 70 to 160 parts by weight of aggregate per 100 parts by weight of cement, and 12 to 16 parts by weight of calcium aluminate cement per 100 parts by weight of cement.

Obviously many modifications and variations of the invention as hereinbefore set forth may be made without departing from the spirit and scope thereof, and therefore only such limitations should be imposed as are indicated in the appended claims.

We claim:
1. An adhesive patching composition having exceptional strength and nonchecking and noncracking characteristics, said composition comprising a mixture of the following ingredients with each of said ingredients being present in parts by weight within the ranges indicated:

| | |
|---|---|
| nonwaterproof Portland cement | 100 |
| mineral aggregate | 35–300 |
| high alumina cement | 8–50 |
| a copolymer of a lower alkyl ester of methacrylic acid and an ester selected from the group consisting of a lower alkyl ester of methacrylic acid and a lower alkyl ester of acrylic acid | 10–100 | and water present in an amount adequate to provide a workable consistency and to hydrate the product.

2. A composition as described in claim 1 wherein the copolymer is the copolymer of methyl acrylate and methyl methacrylate.
3. A composition as described in claim 1 wherein the copolymer employed is the copolymer of methyl methacrylate and ethyl methacrylate.
4. A composition as described in claim 1 wherein the copolymer employed is the copolymer of methyl methacrylate and ethyl methacrylate.
5. A composition as in claim 1 wherein the high alumina cement is calcium aluminate cement.
6. An adhesive patching composition having exceptional strength and nonchecking and noncracking characteristics, said composition comprising a mixture of the following ingredients with each of said ingredients being present in parts by weight in the ranges indicated:

| | |
|---|---|
| nonwaterproof Portland cement | 100 |
| mineral aggregate | 35–100 |
| high alumina cement | 8–50 |
| fibrous material | 2–12 |
| water soluble salt of siliconic acid | 0.04–1 |
| a copolymer of a lower alkyl ester of methacrylic acid and an ester selected from the group consisting of a lower alkyl ester of methacrylic acid and a lower alkyl ester of acrylic acid | 10–100 | and water present in an amount to provide a workable consistency and to hydrate the product.

7. A composition as described in claim 6 wherein the fibrous material is asbestos.
8. The composition of claim 6 wherein the water soluble salt of siliconic acid is sodium methyl siliconate.
9. An adhesive patching composition having exceptional strength and nonchecking and noncracking characteristics, said composition comprising a mixture of the following ingredients with each of said ingredients being present in parts by weight within the ranges indicated:

| | |
|---|---|
| nonwaterproof Portland cement | 100 |
| mineral aggregate | 70–160 |
| calcium aluminate cement | 12–18 |
| fibrous material | 2–12 |
| water soluble salt of siliconic acid | 0.04–1 |
| a copolymer of a lower alkyl ester of methacrylic acid and an ester selected from the group consisting of a lower alkyl ester of methacrylic acid and a lower alkyl ester of acrylic acid | 30–40 | and water present in an amount adequate to provide a workable consistency and to hydrate the product.

10. The composition of claim 9 wherein the water soluble salt of siliconic acid is sodium methyl siliconate.
11. An adhesive patching composition having exceptional strength and nonchecking and noncracking characteristics, said composition comprising a mixture of the following ingredients with each of said ingredients being present in parts by weight within the ranges indicated:

| | |
|---|---|
| nonwaterproof Portland cement | 100 |
| mineral aggregate | 70–160 |
| calcium aluminate cement | 12–18 |
| a copolymer of a lower alkyl ester of methacrylic acid and an ester selected from the group consisting of a lower alkyl ester of methacrylic acid and a lower alkyl ester of acrylic acid | 30–40 | and water present in an amount adequate to provide a workable consistency and to hydrate the product.

12. A composition as in claim 11 wherein the copolymer is the copolymer of methyl acrylate and methyl methacrylate.
13. A composition as in claim 11 wherein the copolymer is the copolymer of methyl methacrylate and ethyl methacrylate.
14. A composition as in claim 11 wherein the copolymer is the copolymer of methyl acrylate and ethyl methacrylate.

References Cited by the Examiner

UNITED STATES PATENTS

| | | | |
|---|---|---|---|
| 2,311,233 | 2/1943 | Jaenicke | 260—29.6 |
| 2,646,846 | 7/1953 | Cutforth | 260—41 |
| 2,795,564 | 6/1957 | Conn et al. | 260—29.6 |
| 3,025,256 | 3/1962 | Janota et al. | 260—29.6 |
| 3,037,881 | 6/1962 | McDowell et al. | 260—29.6 |

FOREIGN PATENTS 804,358 11/1958 Great Britain.

OTHER REFERENCES

Lea et al.: The Chemistry of Cement and Concrete, copyright 1956, Edward Arnold Publishers Ltd., London, pp. 14–16 and 449–452.

Condensed Chemical Dictionary, p. 983, Rheinhold, 1956.

MURRAY TILLMAN, *Primary Examiner.*

DANIEL ARNOLD, LEON J. BERCOVITZ, *Examiners.*

M. FOELAK, *Assistant Examiner.*